US012623948B2

(12) United States Patent
Mitta

(10) Patent No.: US 12,623,948 B2
(45) Date of Patent: May 12, 2026

(54) OPTICAL FIBER GLASS PREFORM AND METHOD FOR DRAWING OPTICAL FIBER GLASS PREFORM

(71) Applicant: Shin-Etsu Chemical Co., Ltd., Tokyo (JP)

(72) Inventor: Ryo Mitta, Ibaraki (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 686 days.

(21) Appl. No.: 17/403,807

(22) Filed: Aug. 16, 2021

(65) Prior Publication Data

US 2022/0055939 A1 Feb. 24, 2022

(30) Foreign Application Priority Data

Aug. 19, 2020 (JP) ................................ 2020-138370

(51) Int. Cl.
*C03B 37/012* (2006.01)
*C03C 13/04* (2006.01)
*G02B 6/12* (2006.01)

(52) U.S. Cl.
CPC ........ *C03B 37/01242* (2013.01); *C03C 13/04* (2013.01); *C03B 2205/47* (2013.01); *C03C 2213/00* (2013.01); *G02B 2006/12038* (2013.01)

(58) Field of Classification Search
CPC .......... C03C 37/0124; C03C 37/01242; C03C 37/014; C03C 37/01466; C03C 2213/00; C03B 2205/47; G02B 2006/12038
USPC ...................... 65/435, 537; 385/147; 428/364
See application file for complete search history.

(56) References Cited

U.S. PATENT DOCUMENTS

| | | | |
|---|---|---|---|
| 2010/0005837 A1 | 1/2010 | Nakanishi | |
| 2012/0055198 A1 | 3/2012 | Otosaka | |
| 2014/0226948 A1* | 8/2014 | Enomoto | G02B 6/10 |
| | | | 65/435 |

(Continued)

FOREIGN PATENT DOCUMENTS

| | | |
|---|---|---|
| JP | 2009001471 A | 1/2009 |
| JP | 2012076989 A | 4/2012 |
| JP | 6198667 B2 | 9/2017 |

(Continued)

OTHER PUBLICATIONS

Office Action issued for counterpart Japanese Application No. 2020-138370, issued by the Japanese Patent Office on Feb. 7, 2023 (drafted on Jan. 30, 2023).

(Continued)

*Primary Examiner* — Camie S Thompson

(57) ABSTRACT

Provided is an optical fiber glass preform, in a preliminary step of a final drawing step, in which the optical fiber glass preform is undergone one or more drawing steps to be drawn to a final target diameter, wherein as an outer diameter of an effective portion of the glass preform is continuously measured in a longitudinal direction, and from outer diameter measurement results obtained, a regression line of y=ax+b is obtained using the least squares method with y as the outer diameter and x as a length, an absolute value of a slope a is less than or equal to 0.005 mm/mm; and a maximum value of an obtained absolute value of a curvature of the outer diameter at any given point, in the outer diameter measurement results obtained, is 0.003 or less.

5 Claims, 3 Drawing Sheets

(56)          References Cited

U.S. PATENT DOCUMENTS

2015/0299023  A1    10/2015  Fujii

FOREIGN PATENT DOCUMENTS

| JP | 2020055722 | * | 4/2020 |
| WO | 2006064608 | A1 | 6/2006 |

OTHER PUBLICATIONS

Office Action issued for counterpart Chinese Application 202110882202. 3, issued by The State Intellectual Property Office of People's Republic of China on Mar. 22, 2025.

* cited by examiner

OPTICAL FIBER GLASS PREFORM AND METHOD FOR DRAWING OPTICAL FIBER GLASS PREFORM

The contents of the following Japanese patent application are incorporated herein by reference:

NO. 2020-138370 filed in JP on Aug. 19, 2020

BACKGROUND

1. Technical Field

The present invention relates to an optical fiber glass preform, and a method for drawing the optical fiber glass preform.

The optical fiber glass preform is produced by, for example, the VAD method or the OVD method or the like. In this method, silicon tetrachloride and other glass raw materials are supplied to a burner together with oxygen and hydrogen gases to cause a flame hydrolysis reaction, and the resulting glass fine particles are deposited on the starting substrate to form a porous glass preform, which is then dehydrated and converted to transparent glass. The optical fiber glass preform thus obtained has an generally cylindrical shape, and after processing it to the average outer diameter, outer diameter variation, and length corresponding to the wire drawing machine, the optical fiber is obtained by drawing the wire with the wire drawing machine.

The glass preform before processing has a generally cylindrical shape, but there is an outer diameter variation in the longitudinal direction. When a preform with a large outer diameter variation is wire-drawn, the clearance at the preform insertion port of the wire drawing machine changes, and the air flow in the furnace of the wire drawing machine is affected by the change, which adversely affects the quality characteristics of the obtained optical fiber. There is also a method of obtaining optical fiber glass preform with an even larger diameter by drawing the optical fiber glass preform produced by the VAD method to a approximately constant outer diameter and providing it as the core material for the OVD method. In this case, the existence of outer diameter variation in the core material causes non-uniform optical properties in the longitudinal direction of the large diameter optical fiber glass preform, which adversely affects the quality characteristics of the optical fiber obtained by wire drawing. For these reasons, it is desirable to perform drawing process on the preform so that the finished outer diameter of the preform is as uniform as possible in the longitudinal direction, and then provide it for the subsequent process. In other words, during the drawing process of the glass preform, the amount of diameter reduction is increased where the outer diameter is large, and the amount of diameter reduction is decreased where the outer diameter is small, resulting in a preform with small outer diameter variation.

Glass lathes and electric furnaces are often used for the drawing process of glass preforms as described above. These devices generally consist of a heating source that heats and softens the glass preform, a chuck that grips the glass preform or a dummy rod connected to the glass preform, and a mechanism that reduces the diameter of the softened glass preform by moving the heating source or the chuck.

However, there are cases where the glass preform before processing has a large outer diameter variation in the entire longitudinal direction or a local outer diameter variation in a relatively short section, and in these cases, the outer diameter variation of the finished preform after processing are also often large. In particular, glass fine particle deposits produced by the VAD method or OVD method consist of a straight body portion and tapered portions at both ends. It is a common method to obtain optical fiber glass preform by advancing it into a heating furnace with one tapered portion vertically downward, and sintering it sequentially from one end to make it transparent glass. During the process of making transparent glass, the sintered glass gradually rises upward from the bottom, causing a outer diameter variation, especially near the boundary between the lower tapered portion and the straight body portion during sintering, where the absolute value of curvature locally increases. In addition, an inclination is generated where the outer diameter tends to become thicker near the lower tapered portion and thinner near the upper tapered portion.

The optical fiber glass preform is used as the original shape of the glass preform before drawing, which is then drawn to a certain outer diameter and used for the subsequent process. In particular, the original shape of the glass preform before drawing has a local outer diameter variation and outer diameter inclination toward the longitudinal direction as described above, and when trying to draw them uniformly to a constant outer diameter, local outer diameter variation and outer diameter inclination toward the longitudinal direction will remain even after drawing. To cope with this issue, it is necessary to perform the drawing step repeatedly until the outer diameter variation becomes small.

For example, Patent Document 1 discloses a method for efficiently drawing optical fiber glass preforms that have a large amount of diameter reduction or local outer diameter variation by repeating the drawing step for multiple times as required. However, in the method disclosed in Patent Document 1, for an optical fiber glass preform with a large local outer diameter variation, it is necessary to repeatedly perform the drawing step until the local outer diameter variation becomes small. This is not only a waste of processing time and materials, but also undesirable because the silica on the surface of the optical fiber glass preform evaporates through repeated drawing, and the optical properties may deviate from those originally designed. Therefore, even when drawing steps are repeated for multiple times, the local outer diameter variation of the optical fiber glass preform should desirably be small in each step.

2. Related Art

Patent Document 1: Japanese Patent No. 6198667

The present invention aims to provide an optical fiber glass preform and a method for drawing the optical fiber glass preform, in which a glass preform before a drawing process having a local outer diameter variation or an outer diameter inclination in the longitudinal direction can be easily drawn to the final target diameter with a few drawing steps, and without the need for additional unnecessary drawing steps.

General Disclosure

In the present invention, the optical fiber glass preform, in a preliminary step of a final drawing step, in which the optical fiber glass preform is undergone one or more drawing steps to be drawn to a final target diameter, wherein as an outer diameter of an effective portion of the glass preform is continuously measured in a longitudinal direction, and from outer diameter measurement results obtained, a regression line of $y=ax+b$ is obtained using the least squares method with $y$ as the outer diameter and $x$ as a length, an obtained absolute value of a slope $a$ is less than or equal to 0.005 mm/mm; and a maximum value of an absolute value of a curvature of the outer diameter at any given point, in the outer diameter measurement results obtained, is 0.003 or less. The optical fiber glass preform may be then further drawn for one or more times to be processed to a final target diameter before being used in a subsequent process. Note that as the outer diameter of the effective portion of the optical fiber glass preform in its original shape before drawing is continuously measured in the longitudinal direction, and from the outer diameter measurement results obtained, the regression line of y=cx+d is obtained using the least squares method with y as the outer diameter and x as the length, an obtained absolute value of a slope c is preferably less than or equal to twice the absolute value of the slope a. The optical fiber glass preform in its original shape is a glass preform obtained by sintering a glass microparticles deposition body produced by a VAD method or an OVD method.

In the present invention, a drawing method of an optical fiber glass preform is provided, for drawing processing the optical fiber glass preform, by a plurality of drawing steps, to a final target diameter, wherein the optical fiber glass preform in a preliminary step of a final drawing step is drawn so that as an outer diameter of an effective portion of the optical fiber glass preform is continuously measured in a longitudinal direction, and from outer diameter measurement results obtained, a regression line of y=ax+b is obtained using the least squares method with y as the outer diameter and x as a length, an obtained absolute value of a slope a is less than or equal to 0.005 mm/mm; and a maximum value of an absolute value of a curvature of the outer diameter at any given point, in the outer diameter measurement results obtained, is 0.003 or less.

According to the present invention, the glass preform is drawn in such a way as to leave the local outer diameter variation and the outer diameter inclination in the longitudinal direction that the glass preform in its original shape has, and the simple drawing control makes it possible to draw the glass preform without leaving behind the local diameter variation across a plurality of drawing devices. Therefore, this may eliminate the need for additional unnecessary drawing steps and reduces the processing time.

DESCRIPTION OF EXEMPLARY EMBODIMENTS

Figure 1:
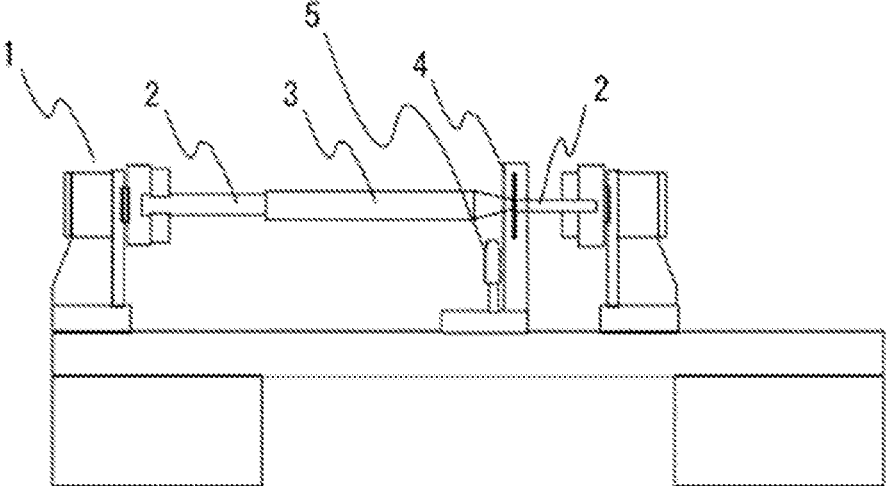
FIG. 1 illustrates a schematic view showing an example of an drawing device.

As a result of earnest investigations, it is found that the local outer diameter variation of the optical fiber glass preform, which is a problem, is due to the original shape of the glass preform before drawing. For the local outer diameter variation and outer diameter inclination toward the longitudinal direction of the glass preform in its original shape, precise drawing control is required when trying to draw the glass preform to a constant outer diameter. When using a plurality of drawing devices, since a subtle difference in the heating condition is to be generated due to the supplying statuses or the like of the heating sources, in a certain drawing device, although an outer diameter, which is excellent to some extent, has been obtained, in another drawing device, a local outer diameter variation might be, on the contrary, accentuated.

Therefore, in the present invention, instead of trying to draw to a uniform outer diameter in the step before drawing to the final diameter, the outer diameter of the effective portion of the glass preform is continuously measured in the longitudinal direction, and from the outer diameter measurement results obtained, the regression line of y=ax+b is obtained using the least squares method with y as the outer diameter and x as the length. If the effective portion of the glass preform is drawn so that the obtained absolute value of the slope a is less than or equal to 0.005 mm/mm, simple drawing control can be used to eliminate the occurrence of local outer diameter variations, and the effective portion of the glass preform can easily be used for the final drawing process. This makes it easier to control the drawing process to the final target diameter, and enables drawing that leaves no local diameter variation across a plurality of drawing devices.

The present invention is described in detail below, but not all combinations of features described in the following embodiments are essential to the solution of the problem, and various forms are possible within the scope of the claims.

Optical fiber glass preforms produced by the VAD method or OVD method or the like have a certain diameter inclination and local bending. Such an optical fiber glass preform can be drawing processed by, for example, the glass lathe as shown in FIG. 1. A dummy rod 2 is welded to both ends of the glass preform 3, and this dummy rod 2 is gripped by the chuck 1 and mounted on the glass lathe. By gripping the dummy rod 2 with the chuck 1, the surface of the glass preform 3 is not scratched, and furthermore, when the glass preform 3 is heated near both ends, the heat damage to the chuck 1 can be reduced. The dummy rod 2 is preferably a glass rod having a cylindrical shape with a small outer diameter variation, which can reduce axial shaking when the glass preform 3 is gripped by the chuck 1 and rotated. The optical fiber glass preform thus set has a diameter reduction due to being drawn with chuck 1 while being heated with the flame of the burner 5.

The diameter reduction of the optical fiber glass preform is performed by the following procedure generally. First, the outer diameter of the glass preform is measured. The outer diameter distribution in the longitudinal direction of the glass preform, that is, the position of the glass preform in the longitudinal direction and the outer diameter at each position are measured at fine intervals in the longitudinal direction. The outer diameter data can be obtained accurately and efficiently by continuously measuring the outer diameter of the glass preform while moving the optical outer diameter measuring instrument 4 mounted on the moving stage of the glass lathe along the longitudinal direction of the glass preform. Based on the position and outer diameter data of the optical fiber glass preform obtained in this way, the diameter of the preform is reduced by moving the burner and controlling the moving speed of the tail according to the target drawing diameter.

If there is a large difference in the outer diameter between the original shape of the glass preform before drawing and the glass preform after drawing, it is common to process the glass preform to its final diameter through a plurality of drawing steps. However, in the present invention, instead of trying to draw the glass preform to a uniform outer diameter in the step before drawing to the final diameter, the outer diameter of the effective portion of the glass preform is continuously measured in the longitudinal direction, and from the outer diameter measurement results obtained, the regression line of y=ax+b is obtained using the least squares method with y as the outer diameter and x as the length. If the effective portion of the glass preform is drawn so that the obtained absolute value of the slope a is less than or equal to 0.005 mm/mm, simple drawing control can be used to eliminate the occurrence of local outer diameter variations, and the effective portion of the glass preform can easily be used for the final drawing process.

Specifically, in the original shape of the glass preform before drawing, it is easy to make fine adjustments, such as drawing the tail relatively slowly at thin outer diameter parts, drawing the tail relatively quickly at thick outer diameter parts, and further controlling the tail speed finely to equalize local variations. In this way, it is possible to obtain a glass preform before final drawing in which the outer diameter variation is not accentuated while the inclination of the outer diameter in the longitudinal direction of the glass preform in its original shape and the local diameter variation are equalized to some extent. In this way, by subjecting the adjusted glass preform to final drawing, a glass preform with a uniform outer diameter in the longitudinal direction can be easily obtained.

The effective portion of the glass preform in the original shape is continuously measured in the longitudinal direction for the outer diameter, and from the outer diameter measurement results obtained, a regression line of y=cx+d is obtained by the least squares method with y as the outer diameter and x as the length, and the absolute value of the slope c obtained should desirably be less than or equal to twice the absolute value of the slope a. Slightly reducing the inclination of the glass preform in its original shape by drawing is extremely effective in producing a glass preform with a uniform outer diameter in the longitudinal direction by subsequent final drawing. Note that although the present invention has been described above using a glass lathe as an example of drawing device, it is also effective when using other types of drawing devices, for example, such as an electrically heated drawing furnace.

Figure 2:
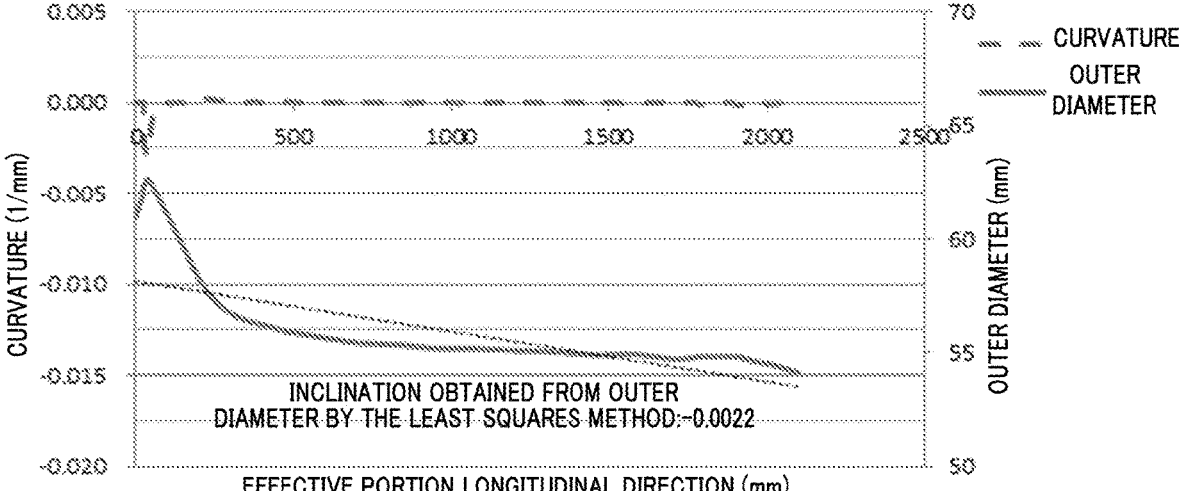
FIG. 2 illustrates one example of a measurement result of an outer diameter of a glass preform obtained by drawing the original shape of the optical fiber glass preform once, and illustrates a regression line obtained by the outer diameter and the curvature in the longitudinal direction of the optical fiber glass preform by the least squares method.
Figure 3:
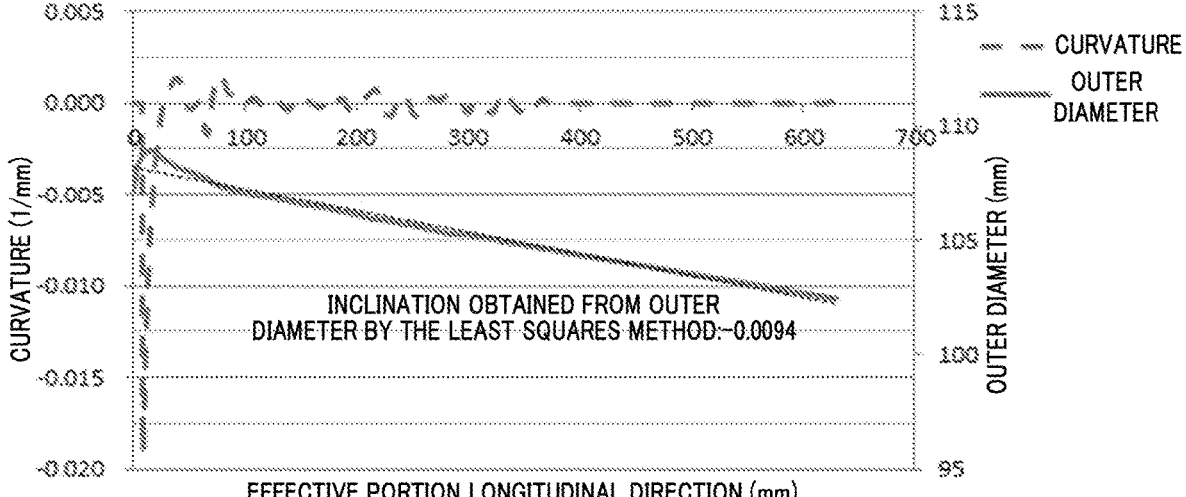
FIG. 3 illustrates a measurement result of the outer diameter of the optical fiber glass preform of the original shape before drawing the optical fiber glass preform, which is used in FIG. 2, and illustrates a regression line obtained by the outer diameter and the curvature in the longitudinal direction of the optical fiber glass preform by the least squares method.

FIG. 2 shows an example of the measurement results of the outer diameter of the glass preform obtained by drawing the optical fiber glass preform in its original shape once, showing the outer diameter and curvature in the longitudinal direction of the optical fiber glass preform and the regression line obtained by the least squares method. FIG. 3 shows the measurement results of the outer diameter of the optical fiber glass preform in its original shape before drawing of the optical fiber glass preform used in FIG. 2, and shows the outer diameter and curvature in the longitudinal direction of the optical fiber glass preform and the regression line obtained by the least squares method. In these figures, the solid line is the outer diameter, the dashed line is the curvature calculated from the outer diameter along the longitudinal direction, and the dotted line is the linear line derived from the outer diameter by the least squares method.

Note that the curvature is calculated as curvature=second derivative/{1+(absolute value of first derivative)$^{1.5}$}, where the first derivative and second derivative of the outer diameter are calculated in the longitudinal direction from the measurement results of the outer diameter of the glass preform.

The absolute values of the slope and curvature derived by the least squares method from the outer diameter of the optical fiber glass preform shown in FIG. 2 are 0.002 and 0.0028, respectively. The areas with large absolute values of curvature are those where local outer diameter variations occurred at the time of the optical fiber glass preform in the original shape. When such a optical fiber glass preform is obtained by drawing, the inclination and local outer diameter variations are gently sloped compared to the optical fiber glass preform in its original shape, which is highly effective for the final drawing to produce a optical fiber glass preform with a uniform outer diameter after that.

Exemplary Embodiment

The porous glass preform deposited by the VAD method is sintered to produce a optical fiber glass preform in its original shape before drawing with a length of 600 mm in the effective portion, 150 mm in the tapered portions at both ends, and an average outer diameter of 100 mm in the effective portion. Note that the shape data of the optical fiber glass preform is obtained from the results of the outer diameter measurement obtained by continuously measuring the outer diameter of the effective portion in the longitudinal direction. The average outer diameter is calculated from the average value of the outer diameters. The effective portion has an inclination, and the absolute value of the inclination of the diameter in the longitudinal direction is 0.015 mm/mm. The tapered portion at both ends is a tapered portion containing an opaque glass portion at one end and a tapered portion consisting of a transparent glass portion at the other end. The tapered portion containing the opaque glass portion is cut at the boundary between the opaque portion and transparent portion of the glass preform. After that, a glass rod with an outer diameter of 60 mm is set as a dummy in the chuck at both ends on the glass lathe, and the cut end of the glass preform is welded to one dummy glass rod and the tapered portion consisting of the transparent glass portion is welded to the other dummy glass rod, thereby completing the setting of the optical fiber glass preform in its original shape before drawing on the glass lathe. The optical fiber glass preform in its original shape before drawing, set on the glass lathe, is drawn to the final target diameter of 50 mm through a plurality of drawing steps. By changing the control of drawing in the plurality of drawing steps, optical fiber glass preforms in Comparative Examples 1 to 4 and Exemplary Embodiments 1 and 2 are prepared. The drawing is controlled as follows.

As a calculation method of the drawing conditions on the glass lathe, the outer diameter of the glass preform before drawing is $D_1$, the target outer diameter of the glass preform after drawing is $D_2$, the burner table moving speed is $V_B$, and the tail moving speed is $V_T$. $V_B \times D_1{}^2 = (V_T + V_B) \times D_2{}^2$, so drawing is performed by controlling $V_T$ while keeping $V_B$ constant.

Comparative Example 1

In the first drawing step, the glass preform is drawn so that the outer diameter of the effective portion of the glass preform is uniformly 55 mm, and in the second drawing step, the glass preform is drawn so that the outer diameter of the effective portion of the glass preform is 50 mm, the final target diameter.

Comparative Example 2

In the first drawing step, the glass preform effective portion is drawn so that its outer diameter is uniformly 55 mm, in the second drawing step, the glass preform effective portion is drawn so that its outer diameter is uniformly 52 mm, and in the third drawing step, the glass preform effective portion is drawn so that its outer diameter is 50 mm, the final target diameter.

Comparative Example 3

In the first drawing step, the glass preform effective portion is drawn to have an inclination of about 0.007 mm/mm in absolute value after drawing, and in the second drawing step, the glass preform effective portion is drawn to have an outer diameter of 50 mm, the final target diameter. Note that the process of tilting after drawing can be easily carried out by gradually changing the target diameter according to the shape.

Comparative Example 4

In the first drawing step, the glass preform effective portion is drawn so that its outer diameter has a slope of about 0.002 mm/mm in absolute value after drawing, and in the second drawing step, the glass preform effective portion is drawn so that its outer diameter is 50 mm, the final target diameter.

Exemplary Embodiment 1

In the first drawing step, the glass preform effective portion is drawn to have an inclination of about 0.004

8 drawing step, the glass preform effective portion is drawn to have an outer diameter of 50 mm, the final target diameter.

The optical fiber glass preforms are drawn under the conditions of the above Comparative Examples 1 to 4 and Exemplary Embodiments 1 to 2, and the evaluation is carried out as follows.

First, the absolute value of the slope of the effective portion, the maximum absolute value of the curvature, and the absolute value of the ratio c/a between the slope c of the effective portion of the glass preform before drawing and the slope a of the effective portion of the glass preform after drawing (hereinafter referred to simply as the ratio c/a of the slope of the effective portion before and after drawing), which are obtained by measuring the outer diameter after the first drawing, are obtained. In addition, the diameter difference obtained by measuring the outer diameter in the effective portion after drawing to the final target diameter is obtained.

From the measurement results of the outer diameter of each glass preform, the first derivative and second derivative of the outer diameter in the longitudinal direction are calculated, and the curvature is calculated from the following equation.

$$\text{Curvature} = \text{second derivative}/\{1+(\text{absolute value of first derivative})^{1.5}\}$$

Note that if the diameter difference in the effective portion after the final drawing step is greater than 0.5 mm, the glass preform is considered to be fail (X), and if it is less than or equal to 0.5 mm, the glass preform is considered to be passed (○), and if it is less than or equal to 0.2 mm, the glass preform considered to be passed (◎), which is even better, because it is easy to obtain good optical properties when it is used in the subsequent process.

The above results are summarized as shown in Table 1.

TABLE 1

| | | After the first drawing step | | After the final drawing step | |
| | | | | The diameter | |
| | The absolute value of the slope of the effective portion | The maximum absolute value of the curvature | The absolute value of slope c/slope a | difference in the effective portion [mm] | Judgement |
| --- | --- | --- | --- | --- | --- |
| Comparative Example 1 | 0.0008 | 0.0070 | 11.75 | 1.1 | X |
| Comparative Example 2 | 0.0009 | 0.0063 | 10.44 | 0.3 | ○ |
| Comparative Example 3 | 0.0072 | 0.0015 | 1.31 | 0.6 | X |
| Comparative Example 4 | 0.0024 | 0.0034 | 3.92 | 0.7 | X |
| Exemplary Embodiment 1 | 0.0041 | 0.0027 | 2.29 | 0.3 | ○ |
| Exemplary Embodiment 2 | 0.0048 | 0.0023 | 1.96 | 0.1 | ◎ | mm/mm in absolute value after drawing, and in the second drawing step, the glass preform effective portion is drawn to have an outer diameter of 50 mm, the final target diameter.

Exemplary Embodiment 2

In the first drawing step, the glass preform effective portion is drawn to have an inclination of about 0.005 mm/mm in absolute value after drawing, and in the second In Comparative Example 1, the absolute value of the effective portion slope after the first drawing step is as small as 0.0008 mm/mm, but the maximum absolute value of the curvature is as large as 0.0070. It can be seen that the local outer diameter variation before drawing is not equalized. After that, the glass preform is drawn regarding the second drawing step as the final drawing step, so the diameter difference within the effective portion after the final drawing step becomes as large as 1.1 mm, and the judgment is fail.

In Comparative Example 2, the absolute value of the effective portion slope after the first drawing step is as small as 0.0009 mm/mm, but the maximum absolute value of the curvature is as large as 0.0063. It can be seen that the local outer diameter variation before drawing is not equalized. But then after the second drawing step, the drawing regards the third drawing step as the final drawing step, thereby a diameter difference within the effective portion becomes 0.3 mm, and the judgment is passed. However, the extra drawing step extends the processing time and increases the materials required for drawing.

In Comparative Example 3, the absolute value of the effective portion slope after the first drawing step is 0.0072 mm/mm, which is larger than that of Comparative Example 1, but the maximum absolute value of the curvature is 0.0015, which is smaller than that of Comparative Example 1. By drawing into an inclined shape, the local outer diameter variation before drawing can be equalized to some extent. However, because the absolute value of the effective portion inclination is too large, the diameter difference within the effective portion after the final drawing step is as large as 0.6 mm, and the judgment is fail.

In Comparative Example 4, the absolute value of the effective portion slope after the first drawing step is 0.0024 mm/mm, which is larger than that of Comparative Example 1, but the maximum absolute value of the curvature is 0.0034 and the diameter difference within the effective portion is 0.7 mm, which is smaller than that of Comparative Example 1. By drawing into an inclined shape in this way, the local outer diameter variation before drawing can be equalized to some extent. However, because the maximum absolute value of curvature is too large, the diameter difference within the effective portion after the final drawing step is as large as 0.7 mm, and the judgment is fail.

In Exemplary Embodiment 1, the absolute value of the effective portion slope after the first drawing step is 0.0041 mm/mm, which is larger than that of Comparative Example 1, but the maximum absolute value of the curvature is 0.0027, which is smaller than that of Comparative Example 1. By drawing into an inclined shape in this way, the local outer diameter variation before drawing can be equalized to some extent. As a result, the diameter difference within the effective portion after the final drawing step becomes as small as 0.3 mm, and the judgment is passed.

Exemplary Embodiment 2 is passed with good results, with a small diameter difference of 0.1 mm within the effective portion after the final drawing step. This can be considered that the maximum absolute value of curvature after the first drawing step is reduced to 0.0023, because the maximum absolute value of curvature is as small as 0.0023 and the absolute value of the ratio of the slope of the effective portion before and after drawing, c/a, is 1.96, which is an appropriate value, and the diameter difference in the effective portion after the final drawing step is as small as 0.1 mm.

From the results in the table above, it can be said that the absolute value of the ratio of the effective portion inclination before and after drawing, c/a, should desirably be less than or equal to 2.

By adopting such a optical fiber glass preform as the preform before the final drawing step, it becomes possible to reduce the diameter difference within the effective portion after the final drawing step, and unnecessary additional drawing steps become unnecessary, which is effective in reducing time and energy consumption. Note that The present invention is not limited to the above-mentioned embodiments, but can be freely transformed and improved as needed.

What is claimed is:

1. An optical fiber glass preform, in a preliminary drawing step of a final drawing step, in which the optical fiber glass preform undergoes one or more further drawing steps to be drawn to a final target diameter, wherein an outer diameter of an effective portion of the optical fiber glass preform continuously measured in a longitudinal direction has an inclined regression line of y=ax+b obtained using a least squares method with y as an outer diameter and x as a length, wherein an absolute value of the slope a of the inclined regression line is between 0.004 mm/mm and 0.005 mm/mm, and a maximum value of an absolute value of a curvature of the outer diameter at any given point over the longitudinal direction is 0.003 $mm^{-1}$ or less.

2. The optical fiber glass preform according to claim 1, wherein the optical fiber glass preform is then further drawn for one or more times to be processed to a final target diameter before being used in a subsequent process.

3. The optical fiber glass preform according to claim 2, wherein the outer diameter of the effective portion of the optical fiber glass preform in its original shape before the preliminary drawing step has an inclined regression line of y=cx+d obtained using the least squares method, wherein an obtained absolute value of the slope c is less than or equal to twice the absolute value of the slope a.

4. The optical fiber glass preform according to claim 3, wherein the optical fiber glass preform in its original shape is a glass preform obtained by sintering a glass microparticles deposition body produced by a VAD method or an OVD method.

5. A drawing method of an optical fiber glass preform for drawing processing the optical fiber glass preform, by a plurality of drawing steps, to a final target diameter, wherein the optical fiber glass preform in a preliminary step of a final drawing step is drawn so that when an outer diameter of an effective portion of the optical fiber glass preform is continuously measured in a longitudinal direction, and from outer diameter measurement results obtained, a regression line of y=ax+b is obtained using the least squares method with y as the outer diameter and x as a length, an obtained absolute value of a slope a is less than or equal to 0.005 mm/mm; and a maximum value of an absolute value of a curvature of the outer diameter at any given point, in the outer diameter measurement results obtained, is 0.003 or less.

* * * * *